United States Patent
Tanaka

(10) Patent No.: US 8,123,364 B2
(45) Date of Patent: Feb. 28, 2012

(54) REAR-PROJECTION TYPE DISPLAY COMPRISING A LIGHT MEASUREMENT UNIT TO MEASURE REFLECTED LIGHT FROM A FRESNEL SCREEN

(75) Inventor: Atsushi Tanaka, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 921 days.

(21) Appl. No.: 11/733,809

(22) Filed: Apr. 11, 2007

(65) Prior Publication Data

US 2007/0247594 A1    Oct. 25, 2007

(30) Foreign Application Priority Data

Apr. 21, 2006    (JP) ................. 2006-118442

(51) Int. Cl.
*G03B 21/22* (2006.01)
*G03B 21/20* (2006.01)
*G01J 1/32* (2006.01)

(52) U.S. Cl. ............... 353/76; 250/205; 353/85

(58) Field of Classification Search .............. 353/31, 353/33, 34, 37, 74–78, 69, 70, 101, 20, 84, 353/85, 87; 359/245–279, 443, 454–458, 359/459, 460; 349/5, 8, 24, 25, 33, 57, 61–68, 349/201–202; 250/205, 229, 216, 208.1

See application file for complete search history.

(56) References Cited

U.S. PATENT DOCUMENTS

| | | | | |
|---|---|---|---|---|
| 5,532,736 A | * | 7/1996 | Kuriki et al. | 348/14.16 |
| 5,738,426 A | * | 4/1998 | Daijogo et al. | 353/31 |
| 6,219,011 B1 | * | 4/2001 | Aloni et al. | 345/1.3 |
| 7,075,718 B2 | * | 7/2006 | Suzuki et al. | 359/457 |
| 7,196,741 B2 | * | 3/2007 | Hicks | 348/745 |
| 2005/0018148 A1 | * | 1/2005 | Hasegawa | 353/98 |
| 2005/0179825 A1 | | 8/2005 | Hicks | |

FOREIGN PATENT DOCUMENTS

| | | |
|---|---|---|
| JP | 08-292407 | 11/1996 |
| JP | 11-242293 | 9/1999 |
| JP | 2003-174651 | 6/2003 |

* cited by examiner

*Primary Examiner* — Que T Le
*Assistant Examiner* — Jennifer Bennett
(74) *Attorney, Agent, or Firm* — Carter, DeLuca, Farrell & Schmidt, LLP

(57) ABSTRACT

In order to provide a display apparatus with high image quality which can detect a change in light on an entire display frame without any influence on user's appreciation, a rear-projection type display apparatus which projects irradiating light from a light source unit onto a fresnel screen through a light valve includes a light measurement unit which is placed at a position where reflected light from the fresnel screen is condensed, and a control unit which controls the light valve on the basis of the measurement result obtained by the light measurement unit.

7 Claims, 10 Drawing Sheets ced to be larger than the screen, and includes sensors arranged on the respective sides of a screen holder (outer peripheral portion) so as not to protrude outside the display portion. In addition, Japanese Patent Laid-Open No. 2003-174651 discloses an arrangement for detecting weak light over a reflecting mirror.

REAR-PROJECTION TYPE DISPLAY COMPRISING A LIGHT MEASUREMENT UNIT TO MEASURE REFLECTED LIGHT FROM A FRESNEL SCREEN

BACKGROUND OF THE INVENTION

1. Field of the Invention

The present invention relates to a display control technique for a rear-projection type display apparatus.

2. Description of the Related Art

A variety of high-quality video sources are available, including video sources such as high-definition television (HDTV) broadcasting. In addition, presentations and the like in meeting rooms are generally conducted with videos on computers. For this reason, increasing demands have arisen for improvement in the image quality of video apparatuses and increases in the screen sizes of the apparatuses used for such purposes. A rear-projection type display apparatus is available as a promising technology for implementing such a high-quality, large-screen display apparatus.

An apparatus designed to project videos by using a high-luminance CRT (Cathode-Ray Tube) had initially been the mainstream of rear-projection type video apparatuses. Recently, however, a rear-projection type video apparatus using a light valve such as a transmissive liquid crystal, a reflective liquid crystal or a digital micro-mirror device (DMD) has become the mainstream. Such an apparatus is designed to apply light to the light valve and enlarge/project video light from an image surface of the light valve onto the screen by using the projection optical system. Many such apparatuses use, as light valves, LCOS (Liquid Crystal On Silicon) panels having characteristics that inter-pixel joints are inconspicuous and the optical control efficiency is high. Note that an LCOS panel is a reflective liquid crystal panel obtained by forming a liquid crystal layer on a semiconductor substrate. This apparatus uses, as a light source, a discharge lamp such as a superhigh pressure mercury lamp or a metal halide lamp owing to its high luminous efficacy.

In general, a discharge lamp as the above light source decreases in luminance level along with operating time. This is caused by a phenomenon called blackening in which the metal of the lamp electrode evaporates, deposits on a portion of the inner surface of the glass of the lamp, and blackens, or a phenomenon called "being devitrified" in which the glass is vitrified by ultraviolet light or the like to become opaque. In addition, the vapor amount of mercury in the lamp changes every moment until a predetermined period of time has elapsed after the start of lighting. For this reason, in this period, the emission spectrum of the lamp changes, resulting in changes in luminance, white balance, and the like. Furthermore, in the liquid crystal panel, for example, the transmission property of the liquid crystal changes due to a change in temperature or the like, resulting in poor white balance and the like.

In order to solve these problems, there have been proposed several methods of detecting projected light and correcting luminance, white balance, and the like. For example, Japanese Patent Laid-Open No. 08-292407 discloses a technology for condensing light from a transmissive liquid crystal panel and providing a sensor on an outer periphery of the aperture portion of a stop provided at the focal point of the light. Providing the sensor at the outer periphery of the aperture portion makes it possible to identify a change in the scattering property of the liquid crystal panel without any influence on the display of the screen. Japanese Patent Laid-Open No. 11-242293 discloses an arrangement for a rear-projection type display apparatus, which has a projection range set in advance to be larger than the screen, and includes sensors arranged on the respective sides of a screen holder (outer peripheral portion) so as not to protrude outside the display portion. In addition, Japanese Patent Laid-Open No. 2003-174651 discloses an arrangement for detecting weak light over a reflecting mirror.

In a light valve, in addition to changes in transmittance with changes in temperature, fluctuations in transmittance may occur depending on the display position on a frame due to variations in cell gaps in the liquid crystal cells even if the same driving voltage is applied. This causes luminance inconsistency in a video projected on the screen. Many apparatuses designed for high-resolution image display have an arrangement which includes liquid crystal panels for the respective colors, i.e., red (R), green (G), and blue (B), and independently controls the panels for the respective colors. In the case of such a three-panel arrangement, if each panel has the above luminance inconsistency, color inconsistency occurs depending on the display position on a frame.

The above prior art, however, detects only light at a portion which is not displayed on the display unit, i.e., part of light. This makes it impossible to measure and correct overall inconsistency on a frame or the like. In addition, sensors are provided around the screen on the assumption that enlarged displacement and the like are performed, and there is a portion which is not displayed on the displayed unit. That is, it is necessary to perform so-called over scanning. However, when a PC frame or the like is to be performed, it is necessary to display the entire frame within the screen. Thus, it is impossible to perform over scanning, resulting in incapability of detection.

SUMMARY OF THE INVENTION

The present invention has been made in consideration of the above problems, and has as its object to provide a display apparatus with high image quality, which can detect changes in light on an overall display frame without any influence on a user's appreciation.

In order to achieve the above object, a projection type display apparatus according to the present invention has the following arrangement.

A rear-projection type display apparatus which projects irradiating light from a light source unit onto a fresnel screen through a light valve, comprising a light measurement unit adapted to be located at a position where reflected light from the fresnel screen is condensed and a control unit adapted to control the light valve on the basis of a measurement result obtained by the light measurement unit.

Alternatively, a rear-projection type display apparatus which projects light from a light source unit onto a fresnel screen through a light valve, comprising a light measurement unit adapted to be placed at a position where reflected light from the fresnel screen is condensed and a control unit adapted to control driving of the light source unit on the basis of a measurement result obtained by the light measurement unit.

In order to achieve the above object, a control method for a projection type display apparatus according to the present invention has the following arrangement.

A control method for a rear-projection type display apparatus which projects irradiating light from a light source unit onto a fresnel screen through a light valve, comprising a light measurement step of measuring a light amount by using an optical sensor located at a position where reflected light from the fresnel screen is condensed and a control step of controlling the light valve on the basis of a light amount measurement result obtained in the light measurement step.

In order to achieve the above object, a control program for a projection type display apparatus according to the present invention has the following arrangement.

A control program for a rear-projection type display apparatus which projects irradiating light from a light source unit onto a fresnel screen through a light valve, comprising a program code for implementing a light measurement step of measuring a light amount by using an optical sensor located at a position where reflected light from the fresnel screen is condensed and a program code for implementing a control step of controlling the light valve on the basis of a light amount measurement result obtained in the light measurement step.

The present invention can provide a display apparatus with high image quality which can detect changes in light on an entire display frame without any influence on user's appreciation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

A preferred embodiment of the present invention will be exemplarily described with reference to the accompanying drawings. Note, however, that the constituent elements described in the embodiment are merely examples, and the scope of the present invention is not limited thereto.

First Embodiment

Figure 1:
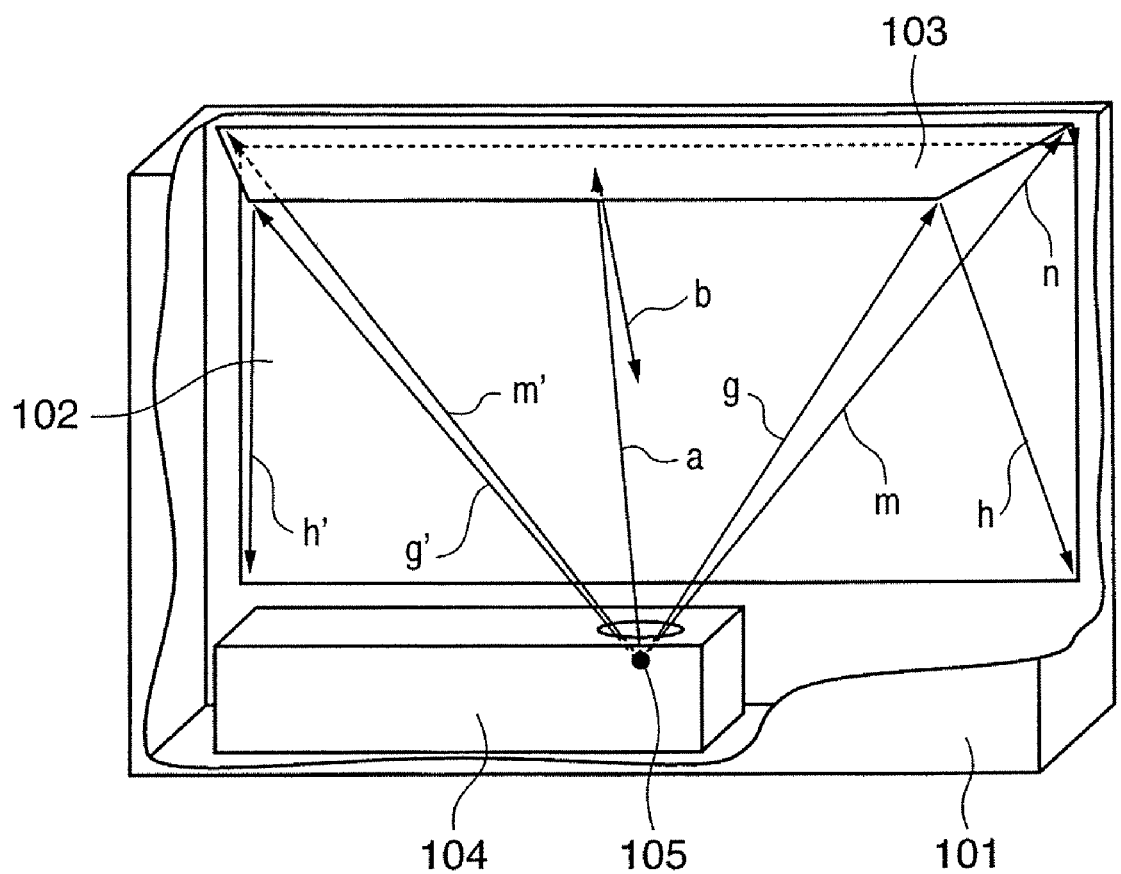
FIG. 1 is a view showing the schematic structure of a rear-projection type display apparatus when viewed from the back of the projection surface.

A rear-projection type display apparatus using LCOS panels will be described as the first embodiment of the projection type display apparatus according to the present invention.
<Structure of Rear-Projection Type Display Apparatus>
FIG. 1 is a view showing the schematic structure of the rear-projection type display apparatus viewed from the back of the projection surface. That is, FIG. 1 shows the arrangement of the apparatus viewed from its inside.

In a housing 101 of the rear-projection type display apparatus, an optical system comprises a projection unit 104, a total reflection fresnel screen 102 (the screen 102), and a ceiling mirror 103.

The ceiling mirror 103 reflects a light beam a projected from the projection unit 104, and projects the light beam as a light beam b onto the screen 102. The ceiling mirror also reflects light beams corresponding to the four corners of the screen 102 to project them on the screen. Light projected on the screen 102 emerges in the direction toward the position of the user, owing to total reflection inside a prism comprising the screen 102 surface, as will be described later.

Figure 2:
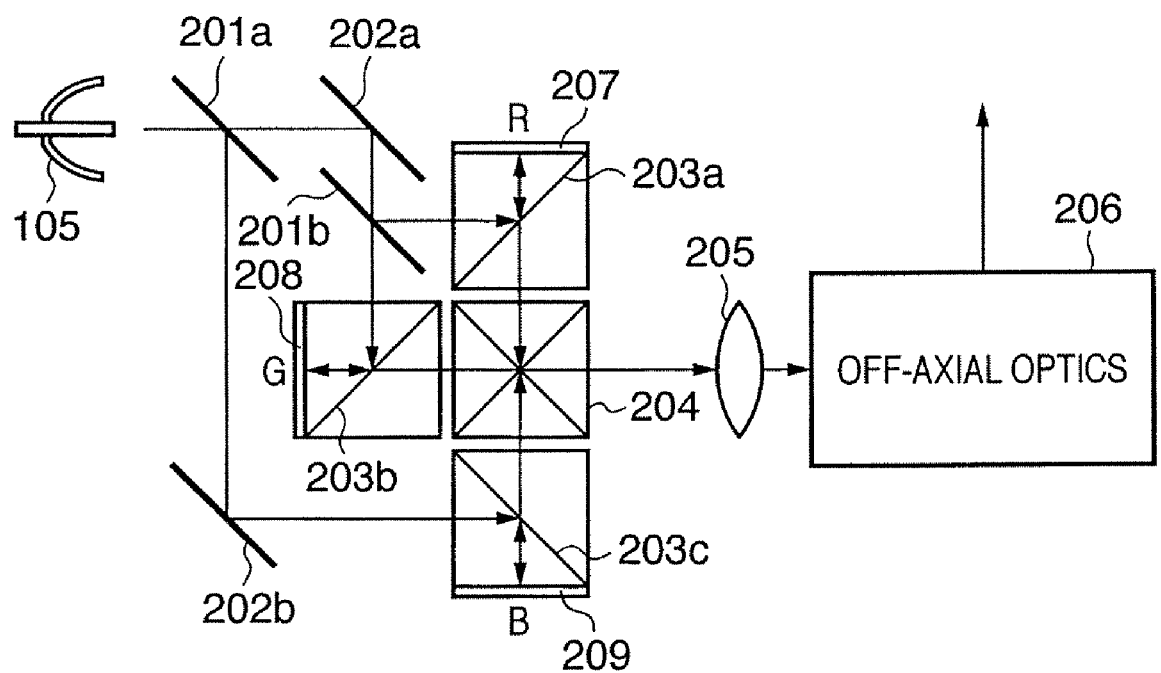
FIG. 2 is a view showing the schematic arrangement of the interior of a projection unit.

FIG. 2 is a view showing the schematic arrangement of the interior of the projection unit.

The projection unit 104 comprises a discharge lamp 105 as a light source. The projection unit 104 also comprises a dichroic mirror 201, mirror 202, polarizing beam splitter (PBS) 203, LCOS panels 207 to 209, cross dichroic prism 204, and lens 205. The optical system comprises an off-axial optics 206.

Many projection type display apparatuses use the discharge lamp 105, such as a superhigh pressure mercury lamp or a metal halide lamp, as a light source, owing to such characteristics as high efficiency, short arc, and the like. Applying a voltage to the discharge lamp 105 can obtain high-luminance light using mercury vapor or the like.

The dichroic mirror 201 separates light from the discharge lamp 105 into light beams of R, G, and B. Referring to FIG. 2, a mirror 201a separates light into a light beam of R+G and a light beam of B, and a mirror 201b separates the light into a light beam of R and a light beam of G. The separated light beams of R, G, and B respectively strike the LCOS panels 207, 208, and 209 through the polarizing beam splitter (PBS) 203.

The LCOS panels 207 to 209 are driven in accordance with video signals of R, G, and B. Reflected light beams corresponding to the video signals pass through the PBS 203 again and strike the cross dichroic prism 204. The cross dichroic prism 204 combines the light beams (videos) of R, G, and B which have struck the cross dichroic prism 204. The combined light emerges toward the ceiling mirror 103 through the lens 205 and the off-axial optics 206. In this case, using the off-axial optics 206 with an offset axis makes it possible to decrease the thickness of the apparatus when the off-axial optics 206 is combined with the screen 102 described above, while reducing the luminance difference between the central portion and the peripheral portion on the screen 102.

Figure 3:
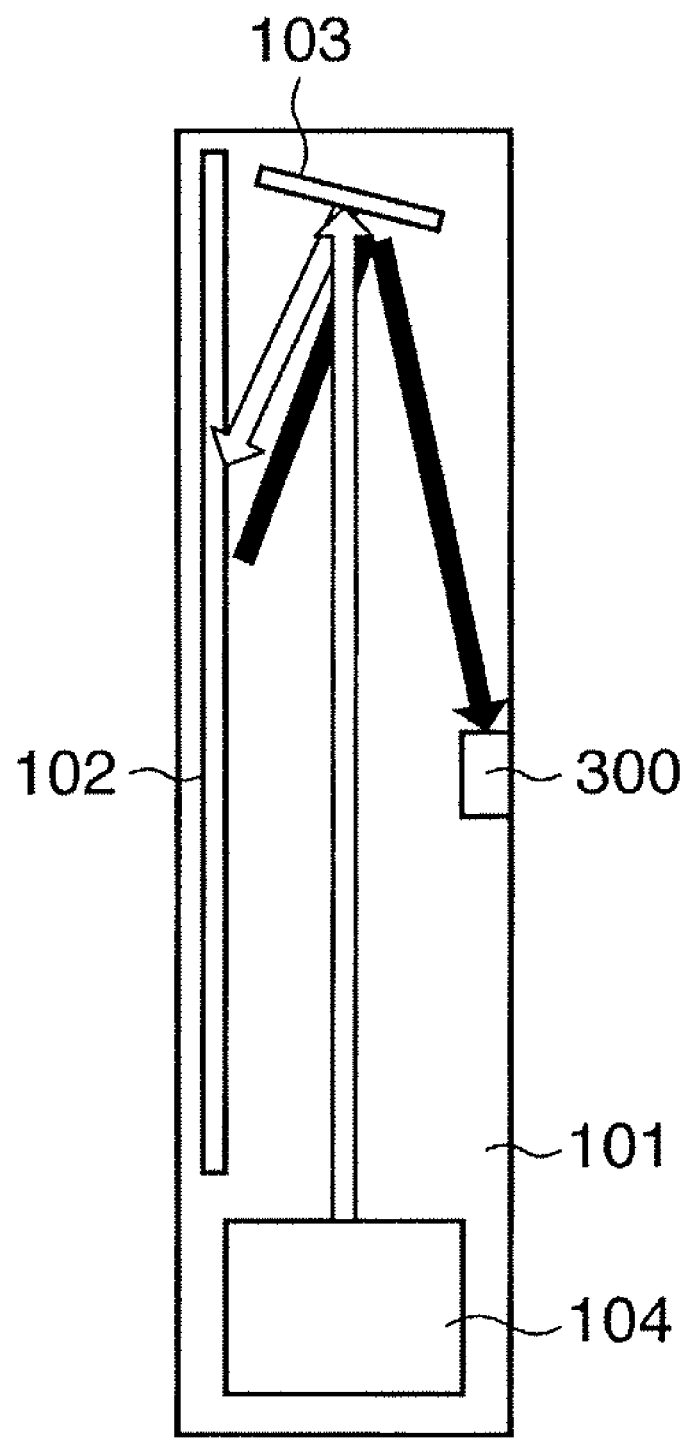
FIG. 3 is a view schematically showing how light from the projection unit is projected on the screen.

FIG. 3 is a view schematically showing how light from the projection unit is projected on the screen. The outlined arrows in FIG. 3 indicate the optical path of video light projected on the screen 102. As will be described later, most of the video light travels toward the front surface of the screen 102 (the left on the drawing), i.e., the position of the user.

However, there is a very small amount of reflected light indicated by the black arrows in FIG. 3. The reflected light is light reflected by the surface of the screen 102 which faces inward of the apparatus. Although it depends on the material, surface treatment, and the like of the screen, 1% to 5% of incident light emerges as reflected light to the opposite side to the screen.

Figure 4:
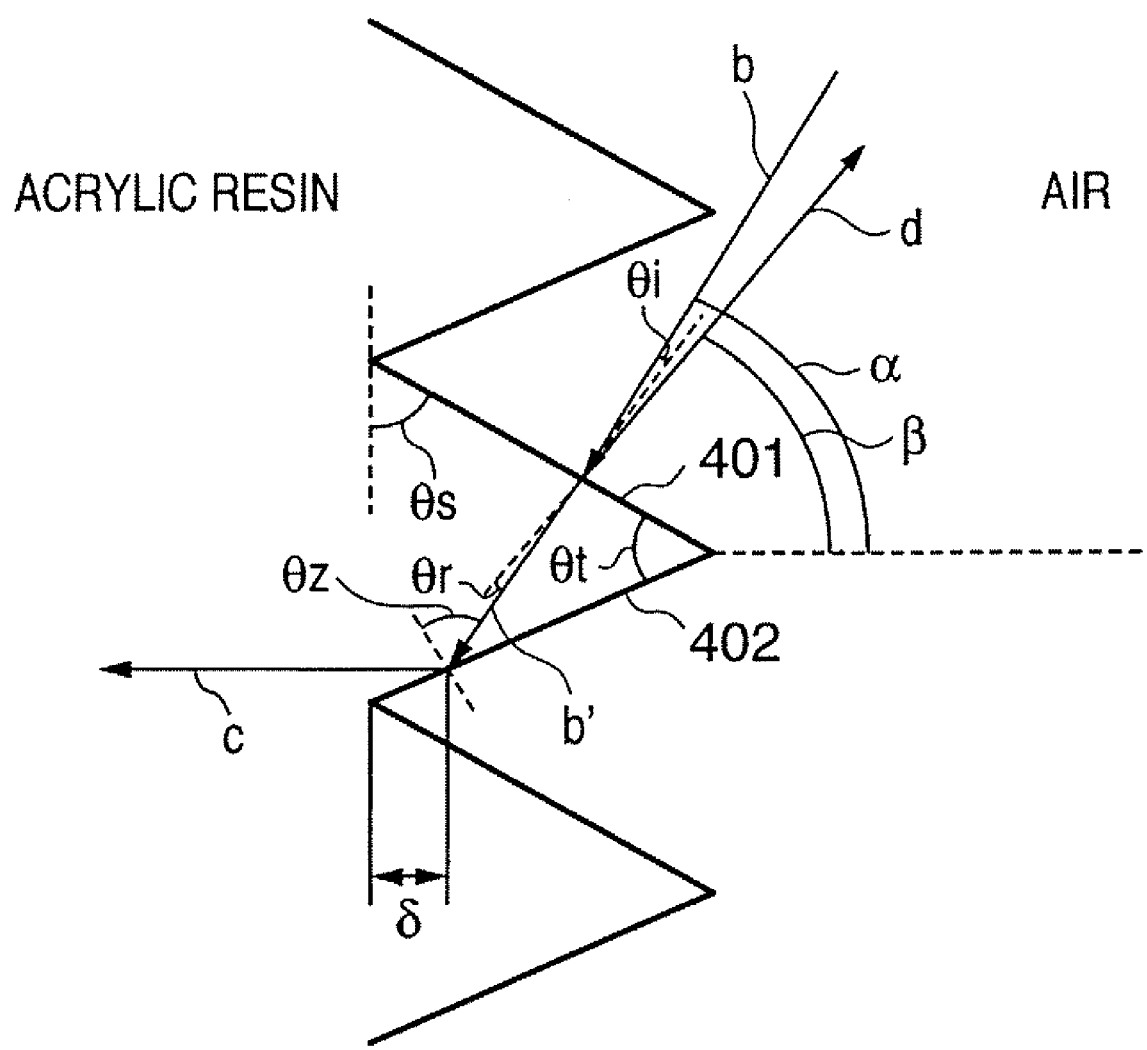
FIG. 4 is an enlarged view of part of a cross-section of a total reflection fresnel screen.

FIG. 4 is an enlarged view of part of a cross-section of the total reflection fresnel screen 102, when it is cut from its center, in a radial direction. The surface of the screen 102 facing inward of the apparatus has a prism-like shape. Note that the left side of the cross-section of FIG. 4 indicates the screen 102 comprising acrylic resin or the like, and the right side of the cross-section indicates a space (air) inside the apparatus.

The vertex angle of the prism is determined to totally reflect the light b from the ceiling mirror 103 toward a direction c as the direction of viewer. Letting $\theta s$ be the angle defined between an incidence surface 401 of the prism and the screen surface, $\theta t$ be the apex angle of the prism, and $\alpha$ be the incidence angle of the light b with respect to the screen surface, an incidence angle $\theta i$ of the light b with respect to the prism surface (incidence surface) can be represented by:

$$\theta i = \alpha - \theta s \quad (1)$$

In addition, letting n be the index of refraction of the material of the prism, an emergence angle $\theta r$ of a light beam b' which is refracted by the incidence surface 401 and emerges is given by:

$$SIN(\theta r) = SIN(\theta i)/n \quad (2)$$

Therefore, an incidence angle $\theta z$ of the light beam b' with respect to a total reflecting surface 402 is given by:

$$\theta z = \theta t - \theta r \quad (3)$$

It is necessary to select $\theta t$ to be equal to or more than a critical angle (42.16° when n=1.49) for total reflection. A condition for making the direction of a totally reflected exit light beam c be perpendicular to the screen surface is represented by:

$$\theta z = 180° - \theta t - \theta s \quad (4)$$

Therefore, equations (1), (2), and (3) are rearranged into:

$$TAN \theta s = (SIN \alpha + n \ SIN \ 2\theta t)/(COS \ \alpha - n \ COS \ 2\theta t) \quad (5)$$

That is, when acrylic resin (n=1.49) is used as a material for the prism (fresnel screen), and $\theta t = 58°$ and $\alpha = 72.97°$, $\theta s = 67.60°$ and $\theta z = 54.40°$.

Since the above equation holds at an arbitrary position within a frame, $\theta s$ and $\theta z$ are obtained as follows with respect to the minimum and maximum values of $\alpha$ with n=1.49 and $\theta t = 58°$: when $\alpha min = 65.22°$, $\theta s = 64.49°$ and $\theta z = 57.51°$, and when $\alpha max = 78.19°$, $\theta s = 69.69°$ and $\theta z = 52.31°$.

Therefore, $\theta s$ is gradually changed from 64.49° to 69.69° so as to match $\theta s$ obtained by equation (5) with respect to $\alpha = 65.22°$ to 78.19° while $\theta t$ is kept constant. Forming a concentric prism group on the surface of the screen 102 so as to match the angles obtained in this manner can make the directions of exit light beams perpendicular to the screen throughout the entire frame range.

As described above, the incidence surface 401 of the prism produces a very small amount of reflected light beam d as well as the transmitted light beam b'. With regard to the amount of reflected light beam d, when the index of refraction of the prism is 1.49, the reflectance is about 4%. Assume that the light beam is reflected by the ceiling mirror 103 and returns to the direction of the screen 102. In this case, the user observes the light beam as a ghost on a display frame. For this reason, it is necessary to select a value for $\theta t$ to prevent light from being reflected in the direction of the screen 102.

Figure 5:
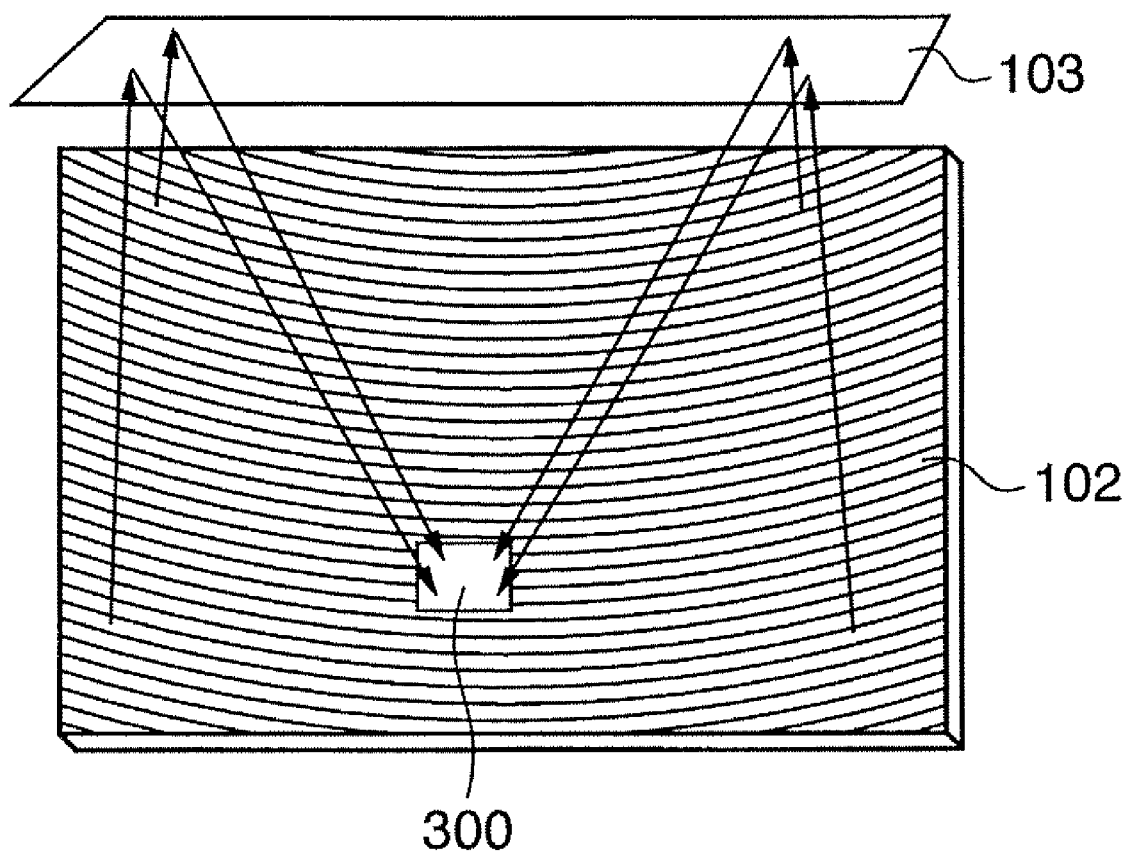
FIG. 5 is a view exemplifying the concentric state of the fresnel screen as viewed from the inside of the apparatus.

FIG. 5 is a view exemplifying the rear surface of the total reflection fresnel screen 102, i.e., the concentric state of the fresnel screen observed from the inside of the apparatus.

As described above, the prism group formed on the surface of the screen 102 has the concentric arrangement to totally reflect the incident light b on the entire region of the screen 102. Note, however, the center of this concentric arrangement is set at a position offset from the optical axis of the main body. This directs light from the ceiling mirror 103 in the central direction at the user's viewer position.

Since the prism group formed on the screen 102 has the concentric arrangement, the reflected light d from the screen 102 shown in FIG. 4 is condensed to a specific condensing area 300. Although it depends on the prism angle, the arrangement of this embodiment will condense reflected light from the entire screen 102 to almost a position on the rear surface of the screen 102.

<Video Signal Processing>

Figure 6:
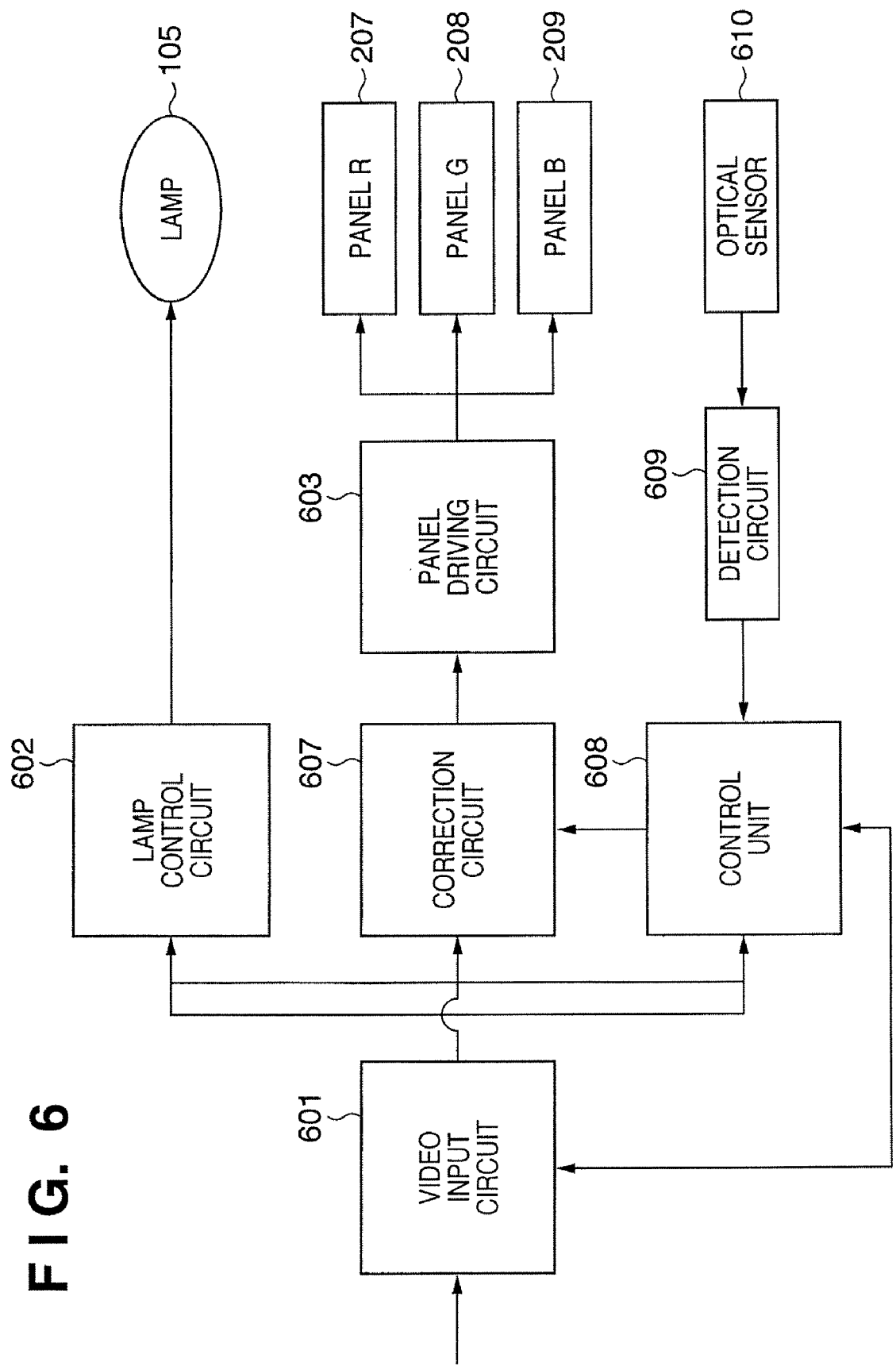
FIG. 6 is a block diagram showing a processing procedure for a video signal.

FIG. 6 is a block diagram showing a processing procedure for a video signal. This apparatus roughly comprises a video input circuit 601, lamp control circuit 602, panel driving circuit 603, correction circuit 607, control unit 608, optical sensor 610, and detection circuit 609.

The video input circuit 601 is a circuit which receives an external video signal, and performs various kinds of image processing, e.g., resolution conversion, IP (Interlace-Progressive) conversion, and color processing.

The lamp control circuit 602 is a circuit for controlling the lighting of the discharge lamp 105. This circuit is called a ballast power supply or the like, in the case of a superhigh pressure mercury lamp. Note that when the apparatus uses an LED instead of the discharge lamp 105, this portion is an LED driving circuit.

The panel driving circuit 603 is a driving circuit for driving the LCOS panels 207 to 209 corresponding to the respective colors, i.e., R, G, and B.

The correction circuit 607 corrects the gamma characteristic or the like of each video signal supplied to the panel driving circuit 603. For example, this circuit is configured to perform, for example, matrix operation determined by a designated correction amount (correction coefficient) for an input signal to obtain an output signal after the correction. Note that a correction amount is stored in a rewritable storage area placed in the correction circuit 607.

The control unit 608 controls the respective circuits described above, and comprises a CPU, RAM, ROM, and the like. The CPU executes the programs stored in the ROM to implement various kinds of control. Note that the ROM stores in advance various kinds of parameters as well as various kinds of control programs. For example, the stored parameters include the initial value of a correction value used for matrix operation by the correction circuit 607 and a reference parameter for white balance to be described later. Note that this apparatus may be configured to store a plurality of parameters corresponding to a plurality of color temperatures (e.g., three color temperatures of 5000K, 6500K, and 9300K) as reference parameters for white balance. The control unit 608 may be formed as an ASIC.

The detection circuit 609 detects a signal from the optical sensor 610 placed in the condensing area 300 for the reflected light d from the screen 102 described with reference to FIG. 5, and comprises an analog/digital (A/D) converter and the like. Using a sensor of a type which incorporates an A/D converter or the like allows direct interfacing with the control unit 608.

The optical sensor 610 which is a characteristic feature of the present invention will be described in detail next. As described in "BACKGROUND OF THE INVENTION", in using an optical sensor in the prior art, the sensor is placed at a screen press portion or the like to measure part of light enlarged/projected (overscanned). In the present invention, the optical sensor 610 is placed at the condensing area 300 for the reflected light d from the screen 102. This makes it possible to always detect the state of video light on the entire surface of the screen 102.

In order to detect reflected light from the screen 102, the state of light to be detected can include the influences of a white balance shift, a change in transmittance with a change in the temperature of LCOS, color inconsistency due to a variation for each region, and the like. That is, performing various kinds of correction on the basis of the detection results on the state of light by the optical sensor 610 makes it possible to provide a display apparatus with higher image quality.

As a sensor to be mounted, the apparatus can use a point sensor in the form of a point such as a single photodiode, a line sensor in the form of a line such as a CCD, a flat area sensor such as a CCD or a CMOS, or the like. This apparatus can selectively use these sensors in accordance with the target accuracy and the like.

Figure 7:
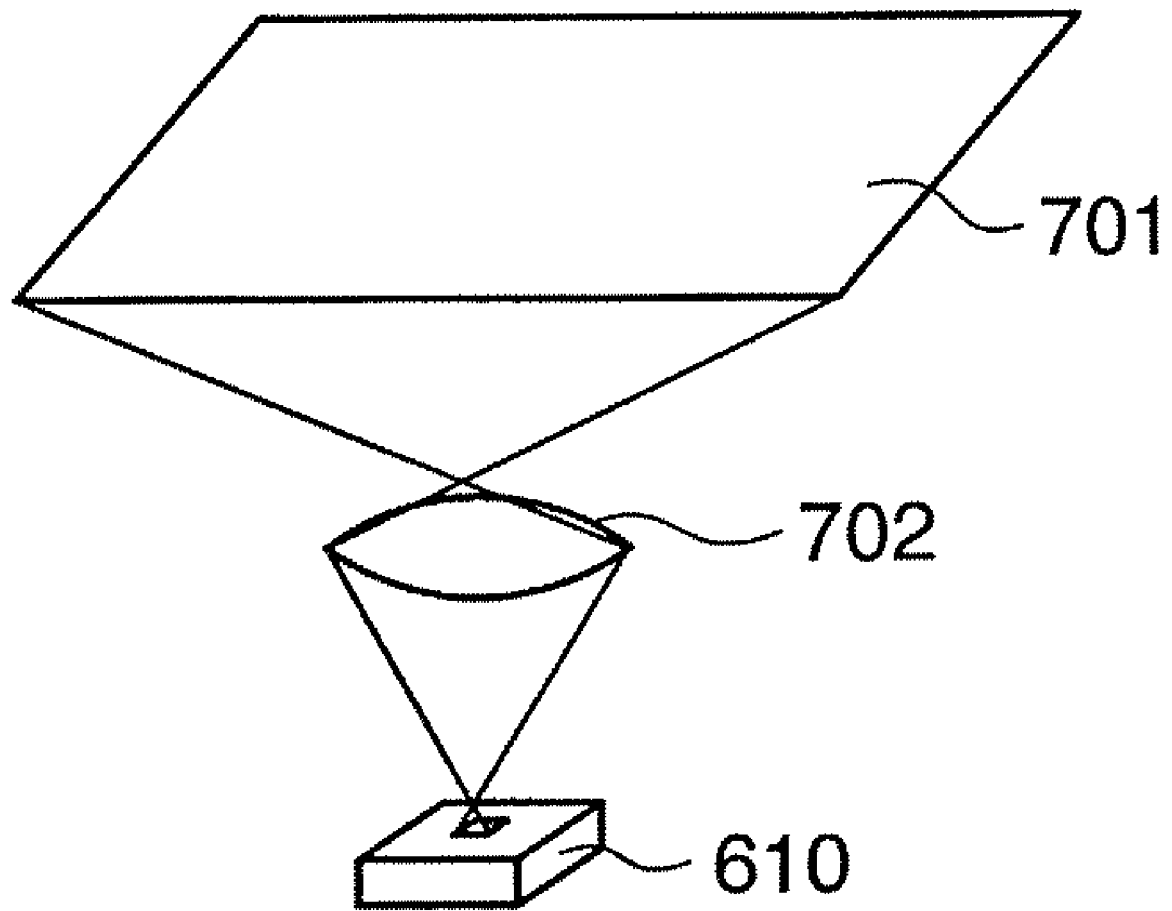
FIG. 7 is a view showing a specific example of an arrangement around an optical sensor.

FIG. 7 is a view showing an example of an arrangement around the optical sensor 610 in a case wherein it measures the average luminance level of the discharge lamp 105. This arrangement includes the optical sensor 610 as a point sensor, a diffusing filter 701 which diffuses reflected light from the screen 102, a lens 702 for condensing light from the diffusing filter 701 onto the optical sensor 610. In addition, this arrangement is configured to make reflected light from the entire surface of the screen 102 strike the diffusing filter 701. With this arrangement, reflected light from the entire screen 102 is diffused and can be measured as an average luminance. Note that in this case, the optical sensor 610 has sensitivity in the entire visible light region including R, G, and B regions.

In addition, this arrangement can measure reflected light corresponding to video light of the respective colors by sequentially displaying R, G, and B colors with time lags as well as measuring reflected light corresponding to video light obtained by combining all R, G, and B light beams. For example, measuring the luminance levels of the respective colors, i.e., R, G, and B, makes it possible to independently detect the luminance levels of the respective colors. Correcting and controlling driving conditions for the LCOSs corresponding to the respective colors on the basis of the respective luminance levels can correct white balance. As a method of correcting driving conditions, for example, there is available a method of performing control to reduce reflected light with respect to light of a color exhibiting a high luminance level by using an LCOS panel and performing control to increase reflected light with respect to light of color exhibiting a low luminance level by using an LCOS panel.

In addition to the above arrangement using a single optical sensor having sensitivity in the entire visible light region, this apparatus may use an arrangement comprising sensors having filter characteristics for R, G, and B. If this arrangement uses the optical sensor 610 having no filter, i.e., a single optical sensor having sensitivity in the entire visible light region, the arrangement performs detection by switching/displaying video light beams of R, G, and B. If the arrangement comprises a plurality of sensors capable of independently measuring the luminances of R, G, and B components, it suffices to performs detection with respect to white light, i.e., video light obtained by combining all R, G, and B components. Note that detecting the luminances of a plurality of video signals having different luminances with respect to the same color makes it possible to correct the rising characteristic ($\gamma$ curve) of light of each color.

Influences of Extraneous Light

In a general appreciation environment, the user rarely appreciates an image under indoor light with very high intensity. However, indoor light, i.e., light from outside the apparatus, may scatter on the screen 102 and enter through the reflection path formed by the prism. In order to reduce the influences of such extraneous light on detection by the above optical sensor, it is preferable to measure incident light on the sensor while video light is off. For example, using the difference between the luminance level measured while video light is off and the luminance level detected by the above detecting operation makes it possible to reduce the influences of extraneous light.

Luminance Inconsistency/Color Inconsistency

In a liquid crystal panel such as an LCOS panel, luminance inconsistency may partially occur for each of the panels of the respective colors due to variations in cell gap and the like. This luminance inconsistency may cause color inconsistency in composite video light.

Figure 8:
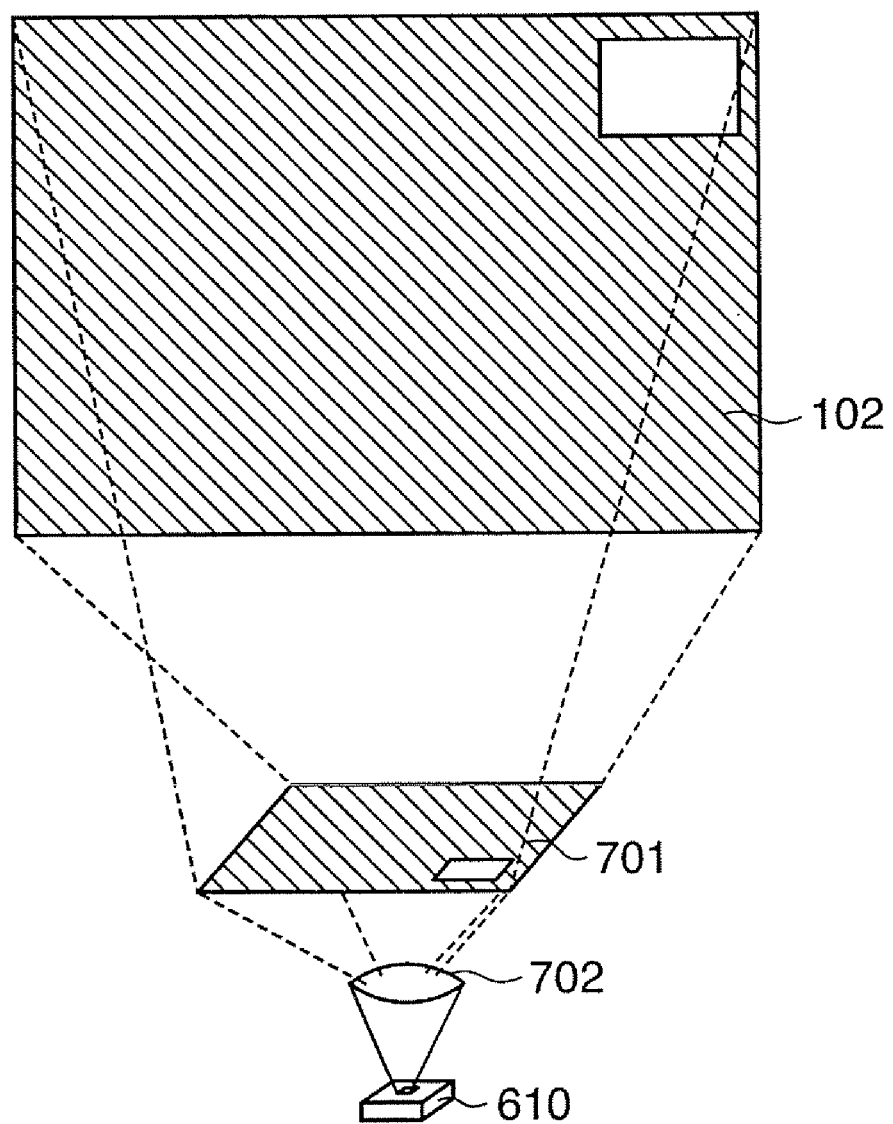
FIG. 8 is a view for explaining how color inconsistency is measured.

FIG. 8 is a view for explaining how color inconsistency is measured. That is, this arrangement is configured to display a predetermined pattern such as a rectangular pattern on a partial region of the screen 102 and detect a luminance level. The arrangement then sequentially moves the display region of the pattern on the screen 102 and determine a correction amount for each region. As the pattern (the size of the region) decreases, the arrangement can perform detection with a higher spatial resolution. In general, however, it takes much time to perform detection on all the regions on the screen, and hence it suffices to determine a pattern in accordance with the spatial resolution required. If this arrangement uses the optical sensor 610 without any filter, i.e., a single optical sensor having sensitivity in the entire visible region, for each region in which a pattern is displayed, the arrangement performs detection while switching/displaying video light beams of R, G, and B. In contrast to this, when the sensor comprises a plurality of sensors capable of independently measuring the luminances of R, G, and B components, it suffices to perform detection with respect to white light, i.e., video light obtained by combining all R, G, and B components.

Upon completing detection in all the regions on the screen, this apparatus determines a correction amount for each region, and stores each correction amount in a storage unit such as a RAM or a flash memory. Performing correction for each region in subsequent image display operation on the basis of the correction amounts stored in the storage unit makes it possible to correct luminance inconsistency/color inconsistency.

<Operation Sequence for Derivation of Correction Value for Color Inconsistency Correction>

Figure 9:
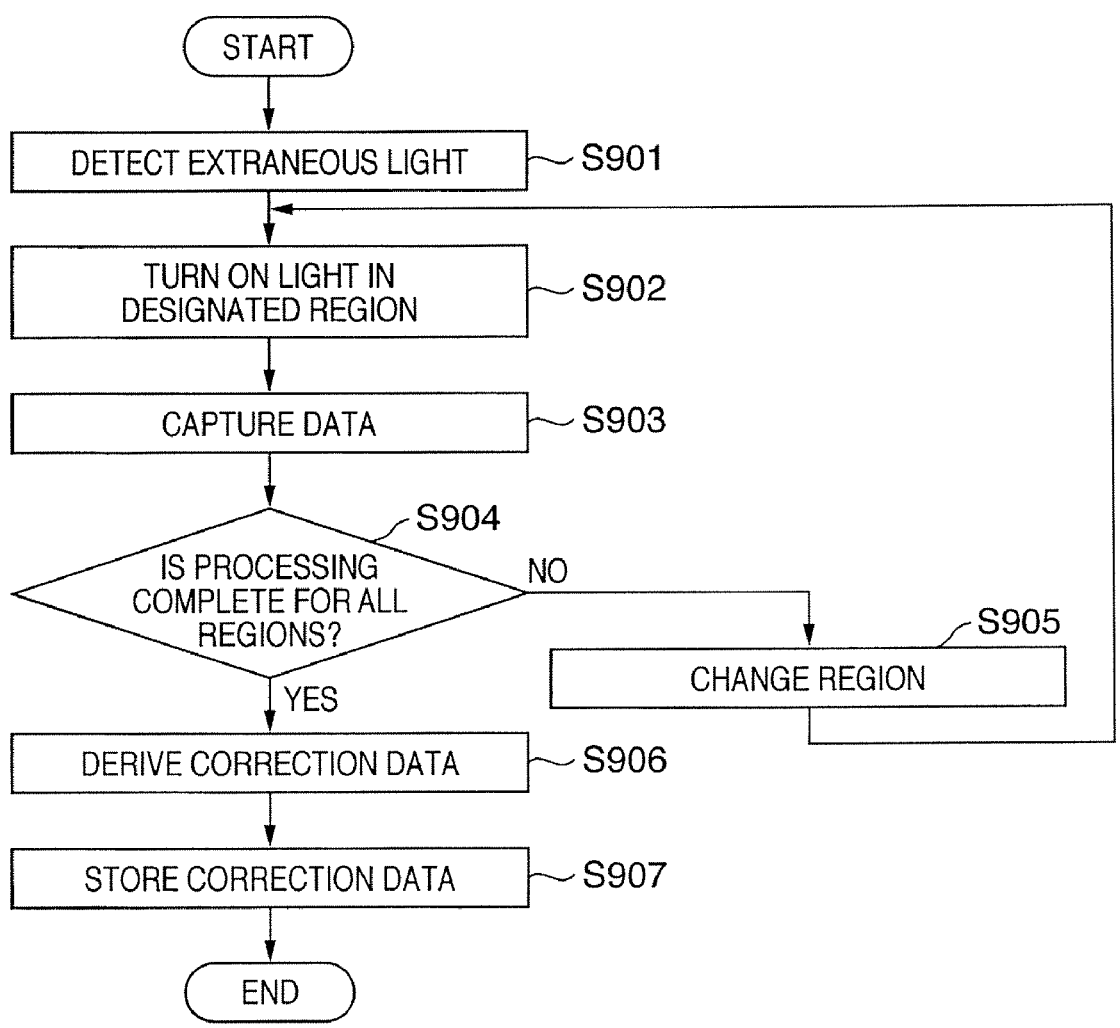
FIG. 9 is a flowchart for correction amount derivation for color inconsistency correction.

FIG. 9 is a flowchart for the derivation of a correction amount for color inconsistency. Note that this apparatus may be configured to execute the following operation at the time of startup or at an arbitrary point of time designated by the user. In the following operation flow, the correction circuit 607 performs correction processing by using correction values for calibration stored in a ROM or the like.

In step S901, the control unit 608 detects extraneous light. That is, as described above, the control unit 608 controls the panel driving circuit 603 to turn off video light. The control unit 608 measures incident light to the optical sensor 610 in this state. Note that the control unit 608 temporarily stores the detection value obtained by the optical sensor 610 in a RAM or the like through the detection circuit 609.

In step S902, the control unit 608 controls the panel driving circuit 603 to display a pattern image in a region as a detection target for a luminance level. The control unit 608 measures incident light to the optical sensor 610 in this state. As described above, when this apparatus uses a single optical sensor having sensitivity in the entire visible light region, the apparatus performs detection while switching/displaying video light beams of R, G, and B. If the sensor comprises a plurality of sensors capable of independently measuring the luminances of R, G, and B components, it suffices to perform detection with respect to white light, i.e., video light obtained by combining all R, G, and B components.

In step S903, the control unit 608 acquires the detection value obtained by the optical sensor 610 through the detection circuit 609, and temporarily stores the value in the RAM or the like in association with the information of the region in which the pattern is displayed in step S902.

In step S904, the control unit 608 determines whether detection processing (S902 or S903) is complete with respect to all the regions on the screen 102. If the control unit 608 determines that the processing is not complete, the process advances to step S905. If the control unit 608 determines that the processing is complete, the process advances to step S906.

In step S905, the control unit 608 selects a next target region for detecting operation. For example, the control unit 608 selects a portion which is adjacent to the preceding region and has not undergone detection. After the control unit 608 detects a region, the process returns to step S902.

In step S906, the control unit 608 calculates the difference between the detection value of the extraneous light stored in step S901 and the detection value in each region stored in step S903. The control unit 608 then determines a new correction amount so as to compensate for an offset from the reference parameter for white balance stored in the ROM. Note that, as described above, a correction amount is, for example, a coefficient in matrix operation used by the correction circuit 607.

In step S907, the control unit 608 stores the new correction amount determined in step S906 in the storage area in the correction circuit 607.

The control unit 608 stores the new parameter in the storage area in the correction circuit 607 and performs matrix operation using the parameter through these steps. This makes it possible to keep the state of the video light projected on the screen 102 almost constant throughout the entire surface of the screen 102. That is, output values obtained by the correction circuit 607 throughout the entire surface of the screen 102 are kept at the color temperature corresponding to the reference parameter for white balance stored in the ROM in the control unit 608.

Note that the correction circuit 607 has been described as a circuit for deriving R, G, and B output values by matrix operation. However, it suffices to implement the same operation by using a correction method using a three-dimensional lookup table (3D-LUT), six-axis correction, gamma table rewriting, or the like. It also suffices to derive output values by a hardware arrangement as well as operation using software. In particular, receiving only a correction amount (correction coefficient) from the control unit 608 and implementing an arithmetic operation portion by using hardware can perform correction processing at high speed.

Figure 10:
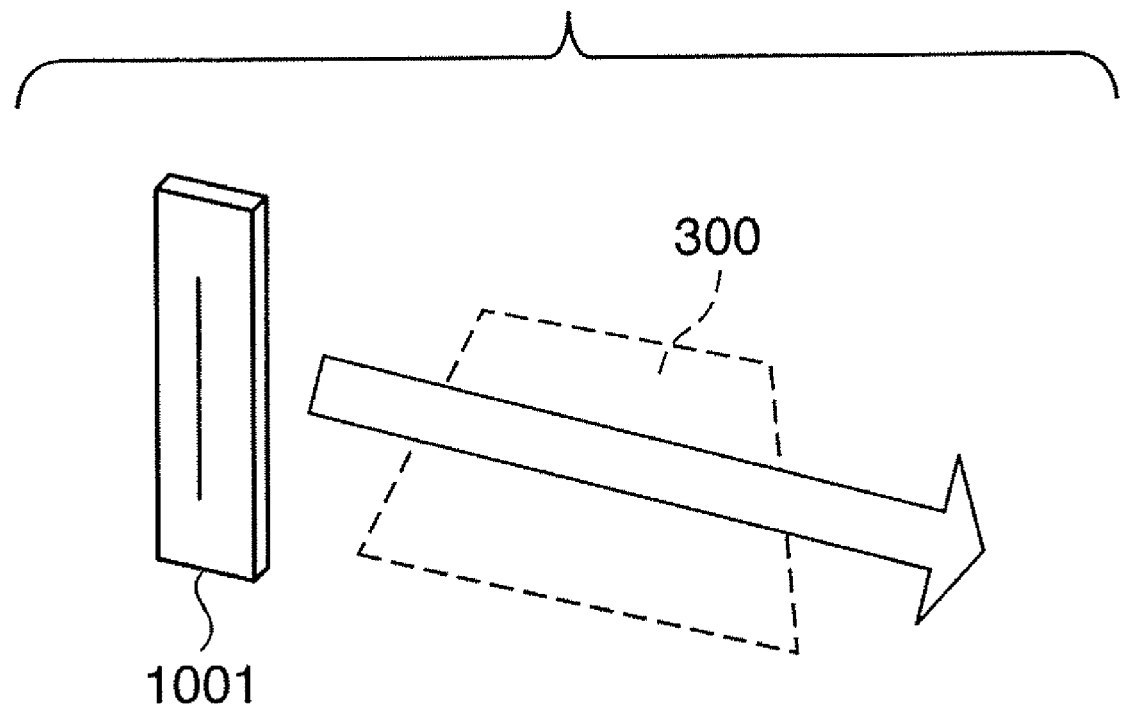
FIG. 10 is a view for explaining an arrangement using a line sensor.

In addition, according to the above description, this apparatus includes the diffusing filter 701 at the condensing area 300 for the reflected light d from the screen 102, causes the lens 702 to condense video light diffused by the diffusing filter 701, and causes the point sensor to detect the luminance of the video light. As described above, however, the arrangement of the sensor is not limited to them. For example, it suffices to directly measure a luminance for each region by using a two-dimensional area sensor covering the condensing area 300. Alternatively, as shown in FIG. 10, it suffices to detect a luminance by scanning a line sensor across the condensing area 300. Using an area sensor or a line sensor will provide a merit of eliminating the necessity to perform luminance detecting operation for each region in the screen 102 which has been described in step S905.

The above description has exemplified the calibration operation independently of normal display operation. However, it suffices to detect an offset by comparing the average luminance/white balance on the entire frame derived from a video signal and the average luminance/white balance measured by the optical sensor 610 while a normal moving image or still image is displayed. If an average luminance/white balance offset has occurred, it suffices to notify the user of the occurrence or automatically shift to the above calibration operation. Alternatively, it suffices to derive a correction coefficient from an offset amount and perform correction for each operation. In this case, the apparatus can perform correction by, for example, setting a correction value table for offset amounts in advance, determining a correction value from an offset amount, and rewriting the matrix correction coefficient of the correction circuit with the determined value.

According to the above description, the condensing area 300 exists on a portion of the rear surface of the rear-projection type apparatus. However, obviously, the position of the condensing area 300 is not limited to that on a portion of the rear surface of the apparatus. For example, when light is to be directly projected onto the screen 102 from below without using the ceiling mirror 103, reflected light from the screen 102 may be condensed on the lower portion of the apparatus. In this case, it suffice to provide the optical sensor 610 at the condensing area 300 on the lower portion of the apparatus. That is, performing measurement at the position where reflected light from the screen 102 is condensed makes it possible to perform efficient measurement without hindrance to appreciation.

The method of reducing the influences of extraneous light at the time of derivation of a correction amount has been partly described. However, this apparatus may be configured to measure the white balance (color temperature) of extraneous light and derive a correction amount for color correction (color temperature correction or the like) so as to cancel the extraneous light. This makes it possible to perform display without any influences of extraneous light.

As described above, this embodiment provides the optical sensor 610 at the condensing area 300 for reflected light from the screen 102. This arrangement can detect a change in light on an entire display frame without any influences on user's appreciation. Controlling the operation of the correction circuit 607 on the basis of this detection result makes it possible to provide a display apparatus with higher image quality.

(Modification)

The first embodiment described above controls the operation of the correction circuit 607 on the basis of the measurement result obtained by the sensor placed at the condensing area for reflected light from the screen 102. That is, this embodiment has been described as an arrangement for controlling driving conditions for the LCOS panels 207 to 209 by controlling the operation of the correction circuit 607, thereby implementing white balance correction. However, the embodiment may also be configured to control driving conditions for the light source instead of the LCOS panels 207 to 209 when performing the same correction with respect to the entire surface of the screen 102. That is, the control unit 608 may control the lamp control circuit 602 on the basis of an output from the detection circuit 609.

Recently, various kinds of apparatuses using LED lamps instead of discharge lamps have been proposed. Along with the development of LEDs with higher luminance, the advent of rear-projection type display apparatuses using LEDs as light sources on the market will easily be expected. Although the luminance of each LED changes with a change in driving current, the value of luminance varies for each element. For this reason, when the apparatus uses LEDs as light sources, variations in the luminance characteristics of the LEDs can pose a serious problem. In this case, correcting forward currents for the LEDs of the respective colors, i.e., R, G, and B, by controlling the lamp control circuit 602 makes it possible to correct variations. As described above, in order to correct an offset which causes the same variations on the entire surface of the screen 102, it is suitable to use the arrangement for controlling the lamp control circuit 602.

Note that the above correction by control on the lamp control circuit 602 can cope with a change over time. In this case, it suffices to use an arrangement for correcting the driving operation of a light valve typified by an LCOS panel or an arrangement for correcting the driving operation of a lamp. Alternatively, it suffices to perform correction by using a combination of these arrangements.

Other Embodiment

Although an embodiment has been described in detail above, the present invention can be applied to a system comprising a plurality of devices, or to an apparatus comprising a single device.

The present invention can be implemented by directly or remotely supplying programs for implementing the functions of the embodiment described above to a system or apparatus and causing the computer of the system or apparatus to read out and execute the programs. Therefore, the technical range of the present invention incorporates the program codes themselves which are installed in a computer to allow the computer to implement the functions/processing of the present invention.

In this case, each program may take any form, e.g., an object code, a program executed by an interpreter, and script data supplied to an OS, as long as it has the function of the program.

As a recording medium for supplying the programs, a floppy (registered trademark) disk, hard disk, optical disk (CD or DVD), magnetooptical disk, magnetic tape, nonvolatile memory card, ROM, or the like can be used.

In addition, methods of supplying the programs include the following. A client computer connects to a homepage on the Internet by using a browser to download each computer program of the present invention itself from the homepage or download a compressed file containing an automatic install function into a recording medium such as a hard disk. Alternatively, the programs can be supplied by dividing the program codes constituting each program of the present invention into a plurality of files, and downloading the respective files from different homepages. That is, the present invention also incorporates a WWW server which allows a plurality of users to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a homepage through the Internet, executing the encrypted programs using the key information, and allowing a computer to install the programs.

The functions of the above embodiment are implemented not only when the readout programs are executed by the computer but also when the OS running on the computer performs part or all of actual processing on the basis of the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs part or all of actual processing on the basis of the instructions of the programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-118442, filed Apr. 21, 2006, which is hereby incorporated by reference herein in its entirety.

What is claimed is:

1. A rear-projection type display apparatus, comprising:
a fresnel screen;
a projection unit which projects irradiating light from a light source unit onto the fresnel screen through a light valve;
a light measurement unit located at a position where reflected light from the fresnel screen is condensed and configured to measure the reflected light; and
a control unit adapted to control the light valve on the basis of a measurement result obtained by said light measurement unit,
wherein a surface of the fresnel screen facing inward of the apparatus has a prism group and the prism group has a concentric arrangement configured to transmit a first part and to reflect a second part of the irradiating light projected onto the fresnel screen, and
wherein only the reflected light from the surface of the prism group is condensed at the position of the light measurement unit and the transmitted light is transmitted via the surface of the prism group such that total internal reflection occurs in the a direction of a viewer.

2. The apparatus according to claim 1, further comprising a position selection unit adapted to control the light valve so as to selectively project light onto part of the fresnel screen.

3. The apparatus according to claim 1, wherein said control unit controls white balance by controlling the light valve.

4. The apparatus according to claim 1, wherein
the light valve comprises light valves respectively corresponding light beams of three colors including R, G, and B, and
said control unit performs correction of color inconsistency by independently controlling the respective light valves.

5. A control method for a rear-projection type display apparatus which projects irradiating light from a light source unit onto a fresnel screen through a light valve, comprising:
a light measurement step of measuring a light amount by using an optical sensor located at a position where reflected light from the fresnel screen is condensed; and
a control step of controlling the light valve on the basis of a light amount measurement result obtained in the light measurement step,
wherein a surface of the fresnel screen facing inward of the apparatus has a prism group and the prism group has a concentric arrangement configured to transmit a first part and to reflect a second part of the irradiating light projected onto the fresnel screen, and
wherein only the reflected light from the surface of the prism group is condensed at the position of the light measurement unit and the transmitted light is transmitted via the surface of the prism group such that total internal reflection occurs in the a direction of a viewer.

6. A non-transitory computer-readable medium storing thereon a control program for a rear-projection type display apparatus which projects irradiating light from a light source unit onto a fresnel screen through a light valve, comprising:
- a program code for implementing a light measurement step of measuring a light amount by using an optical sensor located at a position where reflected light from the fresnel screen is condensed; and
- a program code for implementing a control step of controlling the light valve on the basis of a light amount measurement result obtained in the light measurement step,
- wherein a surface of the fresnel screen facing inward of the apparatus has a prism group and the prism group has a concentric arrangement configured to transmit a first part and to reflect a second part of the irradiating light projected onto the fresnel screen, and
- wherein only the reflected light from the surface of the prism group is condensed at the position of the light measurement unit and the transmitted light is transmitted via the surface of the prism group such that total internal reflection occurs in the a direction of a viewer.

7. A rear-projection type display apparatus which projects light from a light source unit onto a fresnel screen through a light valve, comprising:
- a light measurement unit placed at a position where reflected light from the fresnel screen is condensed; and
- a control unit adapted to control driving of the light source unit on the basis of a measurement result obtained by said light measurement unit,
- wherein a surface of the fresnel screen facing inward of the apparatus has a prism group and the prism group has a concentric arrangement configured to transmit a first part and to reflect a second part of the irradiating light projected onto the fresnel screen, and
- wherein only the reflected light from the surface of the prism group is condensed at the position of the light measurement unit and the transmitted light is transmitted via the surface of the prism group such that total internal reflection occurs in the a direction of a viewer.

* * * * *